United States Patent
Perry et al.

(10) Patent No.: US 7,831,959 B1
(45) Date of Patent: Nov. 9, 2010

(54) METHOD AND APPARATUS TO MANAGE CONFIGURATION FOR MULTIPLE FILE SERVER APPLIANCES

(75) Inventors: Jay B. Perry, San Jose, CA (US); Timothy J. Thompson, San Francisco, CA (US); Raja Shekar CS, Bangalore (IN); Sreenivasa Potakamuri, Sunnyvale, CA (US)

(73) Assignee: NetApp, Inc., Sunnyvale, CA (US)

( * ) Notice: Subject to any disclaimer, the term of this patent is extended or adjusted under 35 U.S.C. 154(b) by 731 days.

(21) Appl. No.: 11/090,604

(22) Filed: Mar. 24, 2005

(51) Int. Cl.
*G06F 9/44* (2006.01)

(52) U.S. Cl. .................. 717/121; 717/168; 717/174

(58) Field of Classification Search .............. 717/121, 717/168–178; 709/220–226
See application file for complete search history.

(56) References Cited

U.S. PATENT DOCUMENTS

| | | | |
|---|---|---|---|
| 6,519,647 B1 * | 2/2003 | Howard et al. .............. 709/229 |
| 6,584,499 B1 * | 6/2003 | Jantz et al. ................... 709/220 |
| 6,757,850 B1 * | 6/2004 | Lehner ......................... 714/48 |
| 7,054,924 B1 * | 5/2006 | Harvey et al. ............... 709/220 |
| 7,096,256 B1 * | 8/2006 | Shafer .......................... 709/220 |
| 7,139,817 B1 | 11/2006 | English et al. |
| 7,305,533 B2 * | 12/2007 | Sato et al. ................... 711/162 |
| 2003/0177344 A1 * | 9/2003 | Harvey, IV ................... 713/1 |
| 2003/0225867 A1 * | 12/2003 | Wedlake ...................... 709/222 |
| 2005/0198581 A1 * | 9/2005 | Soderberg et al. ........... 715/770 |
| 2006/0095547 A1 * | 5/2006 | Cohn .......................... 709/220 |
| 2006/0112173 A1 * | 5/2006 | Cohn et al. .................. 709/220 |

\* cited by examiner

*Primary Examiner*—Wei Y Zhen
*Assistant Examiner*—Matthew J Brophy
(74) *Attorney, Agent, or Firm*—Perkins Coie LLP

(57) ABSTRACT

A system and method are provided to manage configuration of multiple file server appliances. The method comprises obtaining a source configuration from a storage server, and pushing a target configuration associated with the source configuration to one or more target storage servers.

18 Claims, 9 Drawing Sheets

Edit Group Configuration

Help ⓘ
03 Jan 23-27

⊡ child-group

Edit | Group Configuration | ▼

| Filer \ NetCache |

Add Configuration Files

Append existing configuration file to list: | newtest | ▼ |

Create 706    708                               702

| Configuration Files | | | | | View Configuration Summary | |
|---|---|---|---|---|---|---|
| Name | Version | View | Edit | Modification Time | Order | Remove |
| Included from parent-groups | | | | | | |
| global-configs | 7.0.0 | view | edit | 19 Jan 19:05 | | |
| Defined in this group: | | | | | | |
| basic-configs | 6.5.1 | view | edit | 06 Jan 20:59 | down | ☐ |
| cifs-configs | 7.0.0 | view | edit | 24 Nov 04:29 | up \| down | ☐ |
| security-configs | 6.5.1 | view | edit | 06 Jan 20:59 | up | ☐ |

Remove From Group

Push Configuration

Push the configuration files to the following appliances: | All appliances in the group | ▼ |

Push

Status of Configuration Jobs

| Job ID | Status | Submitted | Total | Done | Failed | Delete |
|---|---|---|---|---|---|---|
| 32 | Completed | 06 Jan 20:42 | 3 | 0 | 3 | ☐ |
| 31 | Completed | 30 Dec 16:32 | 2 | 1 | 1 | ☐ |

Delete

FIG. 7

METHOD AND APPARATUS TO MANAGE CONFIGURATION FOR MULTIPLE FILE SERVER APPLIANCES

FIELD OF THE INVENTION

At least one embodiment of the present invention pertains to managing configuration information for multiple devices and specifically to managing configuration information for multiple file server appliances.

BACKGROUND

Conventional computer systems include information about their internal state, such as where software elements are located, where data is maintained for those software elements, and the like, collectively referred to as configuration specification or the configuration file. This is also true of special-purpose computer systems, for example, storage servers such as file servers and network cache servers, which may be implemented as network-attached appliances. Configuration specification may comprise registry settings, as well as one or more files containing configuration parameters. A reference to a configuration file is to be understood to include scenarios where configuration specification is a single file, as well as where configuration information is a collection of data objects.

Managing configuration of a single appliance is relatively straightforward. There are existing tools that allow a user to manage an appliance and to make changes to configuration settings of the appliance remotely via a graphical user interface (GUI) or a command lime interface (CLI). When the number of appliances that need to have their configuration set up and managed increases, it becomes less and less convenient to manage these appliances individually.

Users that have multiple servers may wish to have similar or identical configuration for all of these servers, with the exception of some information that must be unique such as the IP address for a particular server. Performing configuration set up for each server individually may be tedious and time consuming, especially if the number of file servers that need to be configured is large. In another scenario, a user may acquire a new server in addition to its existing array of servers and may need to set up its configuration to match the configuration of the existing servers. Performing the steps of a configuration process for this newly added server, after exact same configuration process has been done at least once before, is inefficient and inconvenient.

A solution for managing configuration information for multiple devices exists for network cache servers, where configuration setting can be created and edited remotely from a centralized appliance management program, as described in the U.S. patent application Ser. No. 09/879,840, entitled "Managing Configuration Information for Multiple Devices." An appliance management program is a software application running on a dedicated server station that permits centralized monitoring of multiple appliances. Such programs may have discovery capability such that it can search the network and discover file servers and network cache servers. Once an appliance management program discovers a file server or a network cache server, it can monitor activity of the discovered servers and collect performance information using one or more network protocols (e.g., SMP, XML, or HTTP). The appliance management program stores performance information in a database, so that users may access this information via a web browser running on an administrator station. An ability to discover file servers, monitor and collect performance date, and perform trend analysis based on the collected information may be referred as passive management. An ability to manage configuration information may be referred to as active management.

There is a need to provide a method and system to efficiently manage configuration information for multiple file servers.

SUMMARY

A system and method are provided to manage configuration of multiple file server appliances. The method comprises obtaining a source configuration from a storage server, and pushing a target configuration associated with the source configuration to one or more target storage servers.

Other aspects of the invention will be apparent from the accompanying figures and from the detailed description that follows.

BRIEF DESCRIPTION OF THE DRAWINGS

One or more embodiments of the present invention are illustrated by way of example and not limitation in the figures of the accompanying drawings, in which like references indicate similar elements and in which:

FIG. 7 is a group configuration page, according to one embodiment of the present invention;

DETAILED DESCRIPTION

According to one embodiment of the present invention, an appliance management program has the ability to manage configuration information for multiple file server appliances. A method and system are provided to enable a user to apply a configuration specification to one or more file server appliances or groups of file server appliances in an efficient and a user-friendly manner.

In a situation where multiple file server appliances are to be configured to have the same or similar configuration specification, the technique being introduced here allows an administrator to configure a first file server appliance (thereby creating a "template" or a "source" configuration), and send a command to the appliance management program directing it to retrieve the source configuration from the first file server appliance and store it at the appliance management station running an appliance management program. Once the source configuration is stored at the appliance management station, a user may associate the source configuration with one or more file server appliances (target file server appliances). The source configuration may then be sent and applied to the target file server appliances, thus making the configuration procedure more efficient and convenient.

Thus, according to one embodiment of the present invention, when a particular source configuration needs to be applied to a plurality of file server appliances, the appliance management program retrieves a source configuration from a designated file server appliance, trims the source configuration if necessary, identifies the target file server appliances, and pushes the full or partial configuration (transfers the configuration without the target servers having to request it first) to the target file server appliances.

Figure 1:
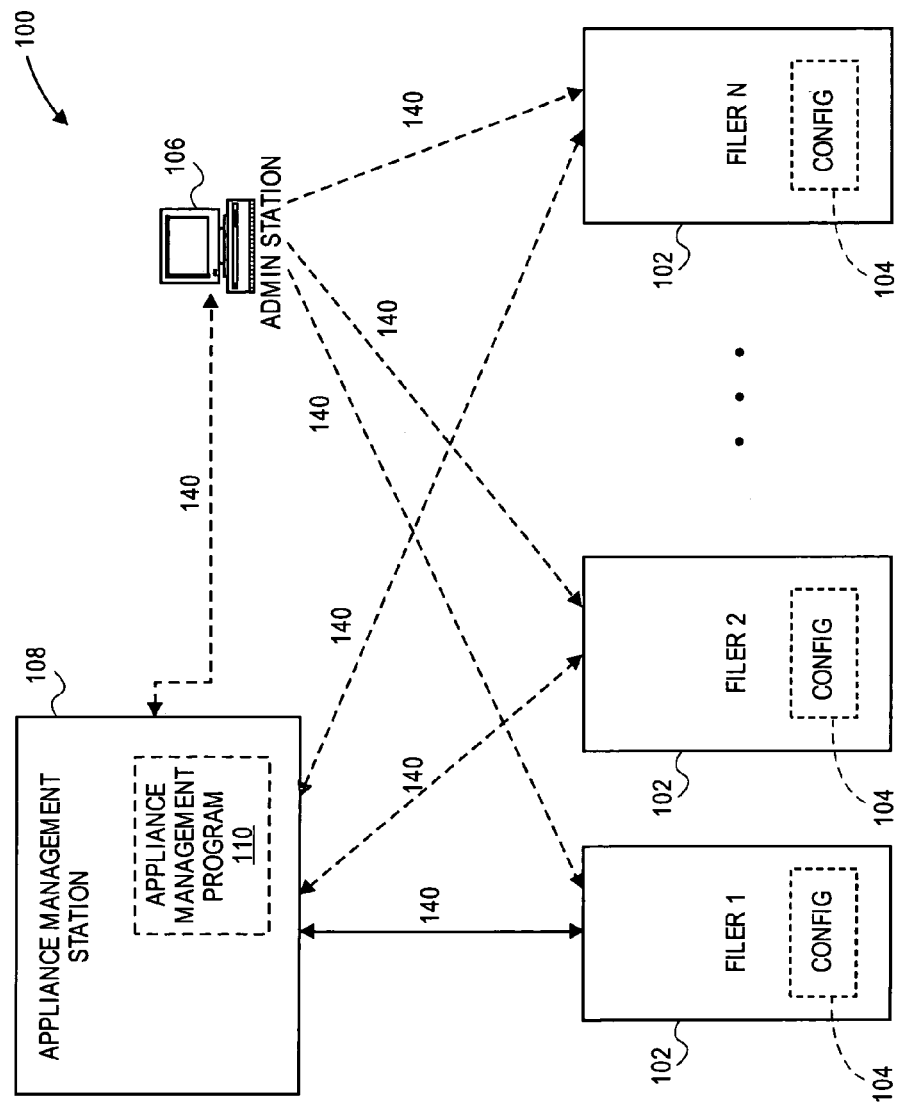
FIG. 1 is a schematic block diagram of a system for managing configuration information for multiple file server appliances, according to one embodiment of the present invention.

FIG. 1 is a schematic block diagram of a system 100 adapted to manage configuration information for multiple file server appliances, according to one embodiment of the present invention. The system 100 includes multiple file server appliances (filers) 102 remotely connected, via communication links 140, to an administrator station 106, and to an appliance management station 108.

The administrator station 106 preferably includes a processor, program and data memory, mass storage, and a network interface to the communication link 140. The administrator station 106 is therefore capable of performing programmed processes and communicating with other elements of the system 100 using the communication link 140. The program and data memory in the administrator station 106 include computer programs and data structures for performing steps described in this application. There is no particular requirement that the administrator station 106 must include mass storage, merely that at least some of their information is retained sufficient for restarting and communicating with other elements of the system 100.

The appliance management station 108 is a general purpose computing platform suitable for use as an enterprise server, such as a Windows® workstation, a Windows® server, or a Linux® station, running an appliance management program 110. The appliance management program 110 is typically a software package providing monitoring and management functionality. It is desirable, according to one embodiment, that the appliance management station 108 is dedicated to running the application management program 110.

Each filer 102 runs a version of a storage operating system and has an associated configuration specification 104. In one embodiment of the present invention, some of the configuration parameters for a filer 102 are kept in an "/etc" directory, which is located in the root volume of the filer.

The configuration specification 104 may be provided on the filer 102 with default parameter settings. A user may subsequently edit the default parameters or add new parameters, utilizing, e.g., a web browser running on the administrator station 106. The appliance management program 110 provided on the appliance management station 108 is configured to collect and analyze data associated with performance of each of the filers 102, as well as to retrieve configuration information 104 from a particular filer 102, and to push some or all of the parameters of the configuration specification 104 to other filers.

Figure 2:
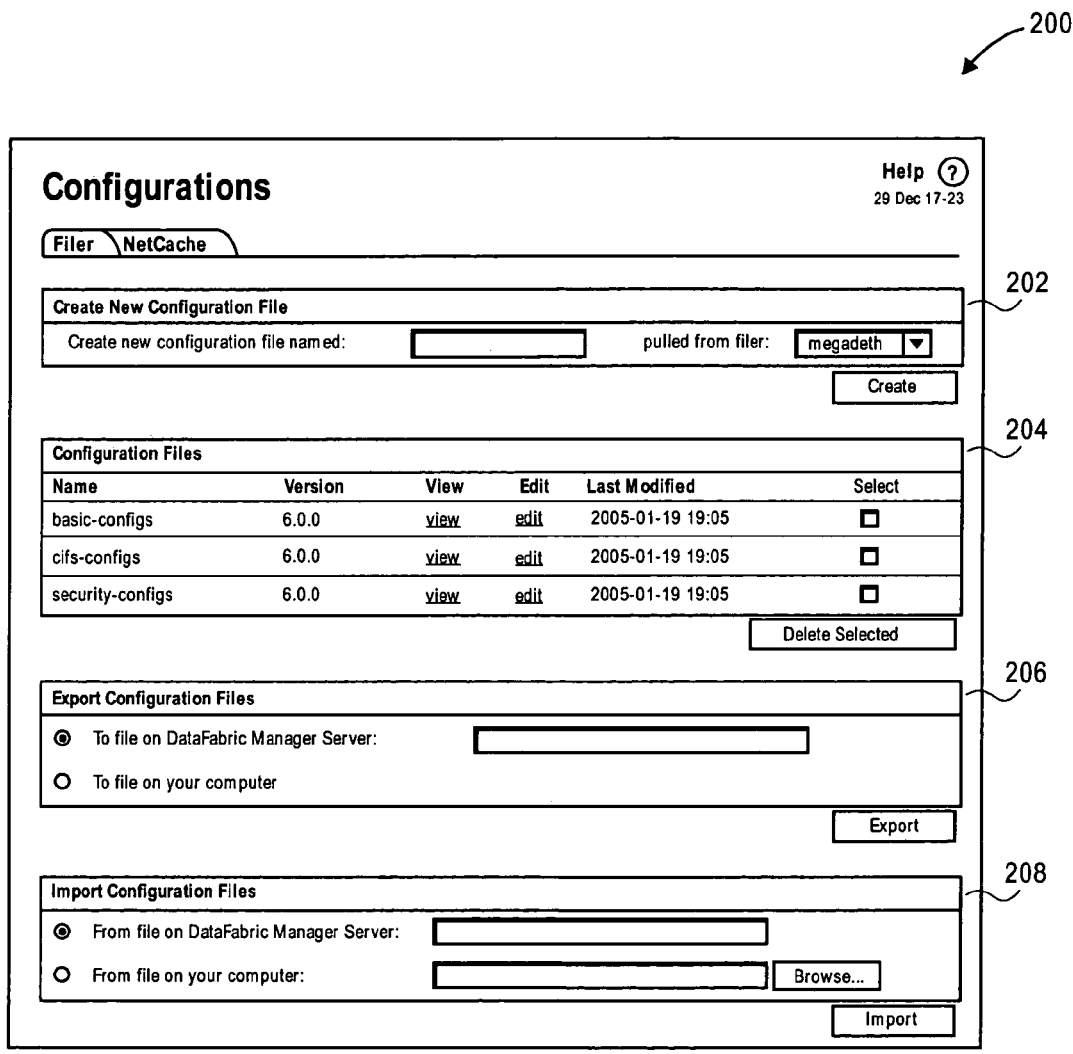
FIG. 2 is a file server appliance configuration page, according to one embodiment of the present invention.

FIG. 2 shows a filer configuration page 200 provided by the application management program 110, according to one embodiment of the present invention. The filer configuration page 200 allows a user to create a new configuration file based on configuration specification retrieved (or pulled) from a particular filer (area 202), view the list of existing configuration files (area 204), to view the contents of a selected configuration file (area 204), edit a configuration file (e.g., to create partial configuration file) (area 204), and export/import configuration files for backup purposes (areas 206 and 208). In one embodiment, in order to view the configurations page 200, view a configuration file, and to export the configurations, a high level read privilege may be required. Similarly, in order to create, delete, edit, or import configuration files, a high level write privilege may be required.

Figure 3:
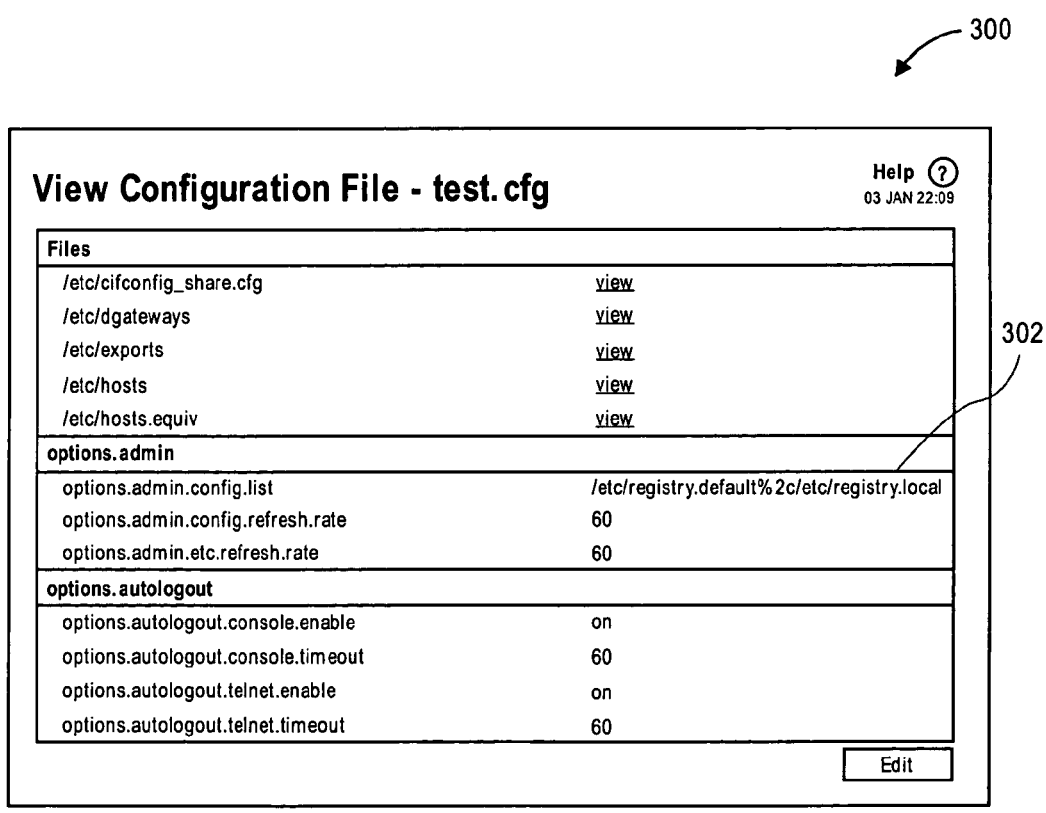
FIG. 3 is a file server appliance configuration viewing page, according to one embodiment of the present invention.
Figure 4:
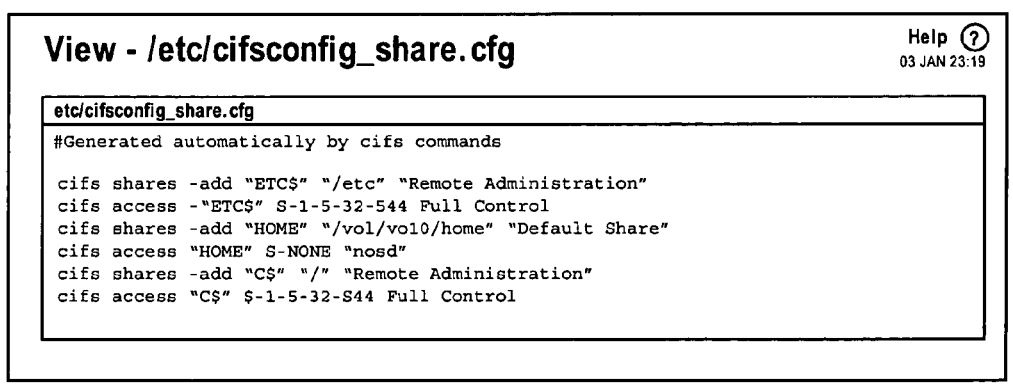
FIG. 4 is a configuration file viewing page, according to one embodiment of the present invention.

The application management program 110 also provides, in one embodiment, a configuration viewing page 300 illustrated in FIG. 3. The configuration viewing page 300 allows a user to see configuration keys (parameter names) and associated values that are part of a configuration specification. A user may also view the contents of configuration files located in the "/etc" directory of a filer 102 by activating a link 302. The contents of an illustrative configuration file 400 are shown in FIG. 4.

Returning to FIG. 1, in one embodiment, the communication links 140 between the devices of the system 100 includes a local area network (LAN). However, in alternative embodiments, the communication links 140 may include any technique for communicating information, including without limitation a wide area network (WAN), an enterprise network, a virtual private network (VPN), a private or public switched network, or some combination or variant thereof.

There is no particular requirement that the communication links 140 must have any particular physical form, only that the filers 102, the appliance management station 106, and the administrator station 108 can communicate with each other using the communication links 140. In a preferred embodiment, each element of the system 100 is accessible by other elements using a protocol such as HyperText Transfer Protocol (HTTP), Secure HyperText Transfer Protocol (SHTTP), or a variant thereof. However, there is no particular requirement that such HTTP access must be direct access; the communication link 140 may include intermediate devices such as proxies, firewalls, Network Address Translation (NAT) translators, and the like.

Figure 5:
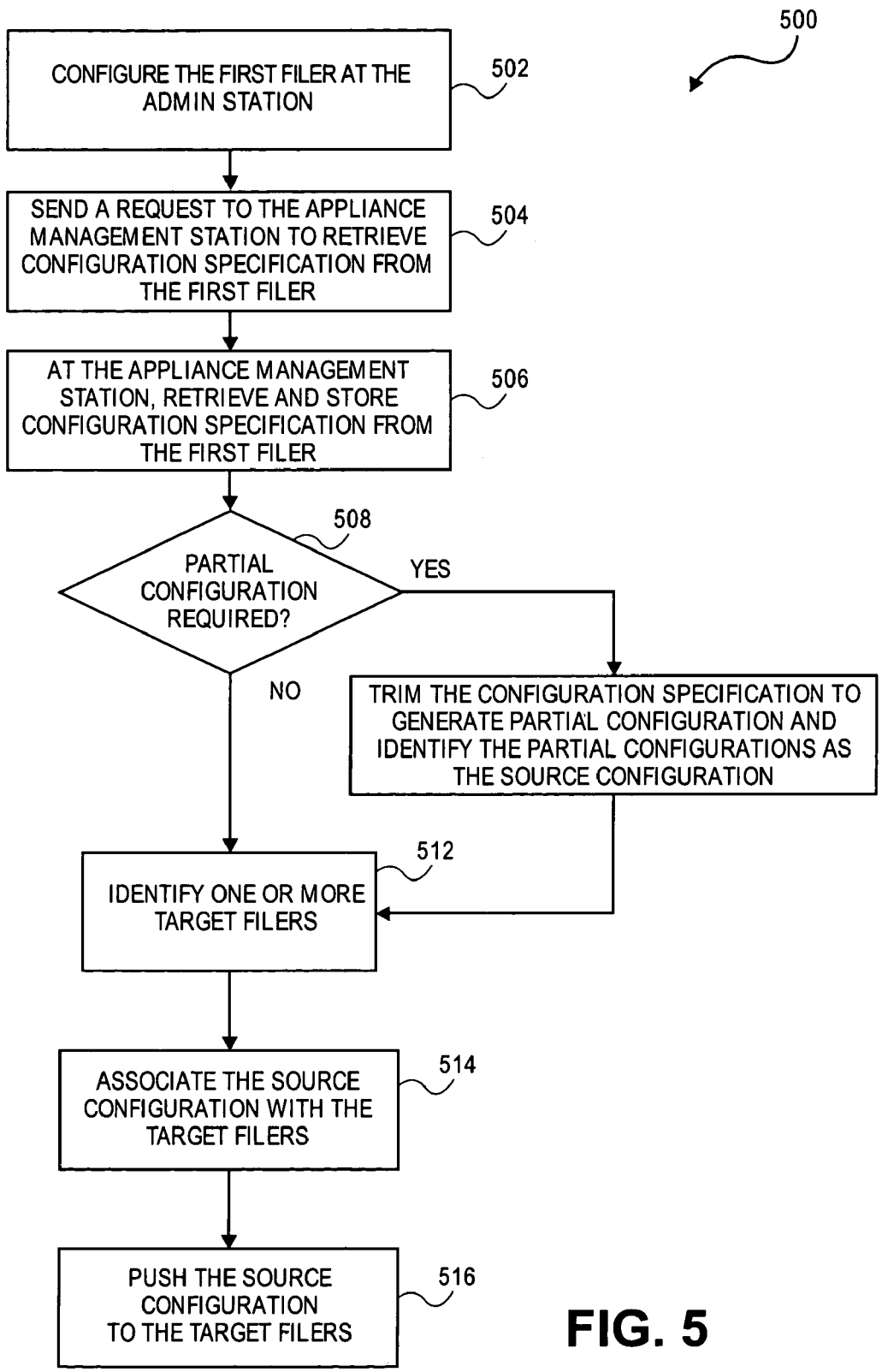
FIG. 5 is a flow chart illustrating a method to manage configuration information for multiple file server appliances, according to one embodiment of the present invention.

FIG. 5 is a flow chart illustrating a method 500 to manage configuration information for multiple file server appliances, according to one embodiment of the present invention.

In a scenario where a user utilizes a plurality of filers 102, configuration may be first created on one of the filers 102. This may be accomplished via the administrator station 108 remotely connected to the filer 102. Configuration information may be represented by a single file or by a plurality of data objects.

Once the desired configuration has been set up for the first filer at operation 502, a command is sent at operation 504 from the administrator station 106 (e.g., utilizing a web browser) to the appliance management program 110 requesting that the appliance management program retrieves the source configuration from the first filer. The appliance management program 110 retrieves the source configuration from the first filer at operation 506 and, if the source configuration does not have to be trimmed, identifies target filers at operation 512 and associates the source configuration with the target filers at operation 514.

In one embodiment of the present invention, the plurality of filers 102 present in the system 100 may need to be updated with respect to just one configuration parameter. If it is determined, at operation 508, that not all parameters that are present in the source configuration need to be propagated to the target filers 102, the source configuration is manipulated at operation 510 to either extract the parameters to be distributed to the target filers or to trim the source configuration to leave just the selected parameters. Such reduced (or trimmed) configuration is then considered to be the source configuration that is then associated with the target filers at operation 514. At operation 516, the appliance management program 110 pushes the source configuration to the associated target filers.

Figure 6:
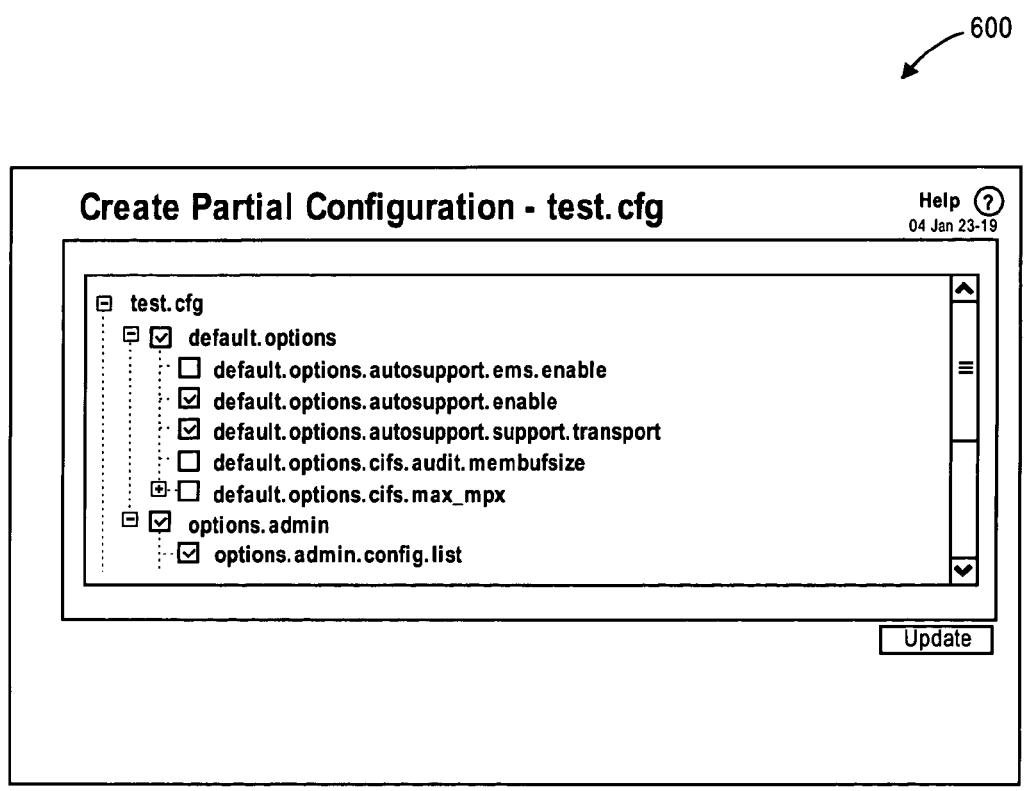
FIG. 6 is a configuration trimming page, according to one embodiment of the present invention.

For example, configuration may need to be updated to reflect a newly introduced domain name server (DNS). A user may add or update a configuration parameter on one of the filers (at operation 502) to reflect the new DNS server and request the appliance management program 110 (at operation 504) to retrieve the updated configuration and to push just the updated parameter to the rest of the filers. The appliance management program 110 then retrieves the updated configuration (at operation 506), trims it to isolate the desired parameter (at operation 510), and pushes this partial configuration to the rest of the filers 102 (at operation 516). Thus, partial configuration may include one or more configuration parameters from configuration. It will be noted that in order to generate partial configuration, the appliance management program trims the configuration to extract the particular settings (name-value pairs). An illustrative configuration trimming page 600 is shown in FIG. 6.

The configuration of a filer may be created or edited in order to change it from its default settings utilizing a client software having a web based GUI. The client software may be running, in one embodiment, on the administrator station 106. Configuration of a filer may be accessed directly via Telnet, via a remote shell (RSH), or via a serial port console. However, in order to distribute a particular configuration to multiple filers, the source configuration is first retrieved and stored by the appliance management program 110 and then distributed to the target multiple filers.

In one illustrative embodiment, the appliance management program 110 has a grouping mechanism that permits a user to sort or define related objects. For example, a user may start out with associating the source configuration with one or more filers (at operation 514) by putting the source configuration file in a particular target group containing one or more filers. A user may then edit the target group to add or remove filers from the group in order to designate the target filers to which the source configuration is to be applied. An illustrative edit group configuration page 700, as shown in FIG. 7, allows a user to add an existing configuration file to the configuration list of this group. The edit group configuration page 700 allows a user to remove a configuration file from the configuration list utilizing a control button 702, change the order of the files in the configuration list (controls 704), view/edit a configuration file (controls 706 an 708), view the versions of configuration files, push configuration to some or all filers in the group (control 710), and view the status of previous push jobs (area 712).

In one embodiment, in order to be allowed to add a configuration file to a group or to delete configuration file from a group, a user may be required to have a high level write privilege. Similarly, in order to be allowed to delete entries from a job status table (area 712), a high level delete privilege may be required.

The grouping mechanism may be a convenient way to associate particular configuration settings (e.g., a partial configuration) with a group of filers. For example, a partial configuration with one set of regional settings may be associated with the filers located in Sunnyvale, Calif., while another partial configuration with different regional settings may be associated with a group of filers that are physically located in Tokyo, Japan.

Utilizing the method 500 and the system 100, where filers 102 are needed to run with similar configuration settings, a user only has to set up configuration once, on the first filer, after which the configuration may be distributed to all of the target filers via the appliance management station 108. It will be noted that, for the purposes of this description, the term configuration specification refers to settings such as startup parameters, communication protocols, and access control settings, as opposed to parameters that designate allocation of storage resources among various users or groups.

As described above, the appliance management program 110 permits a user to select a target file server appliance or a group of target file server appliances. A user may also define the target group of file server appliances, as well as add and remove the file server appliances from the target group. The appliance management program, in one embodiment may be configured to store multiple configuration specification. A user may select a particular configuration specification, associate the full or partial configuration with a target group of file server appliances and push the selected configuration specification to the selected target group.

Figure 8:
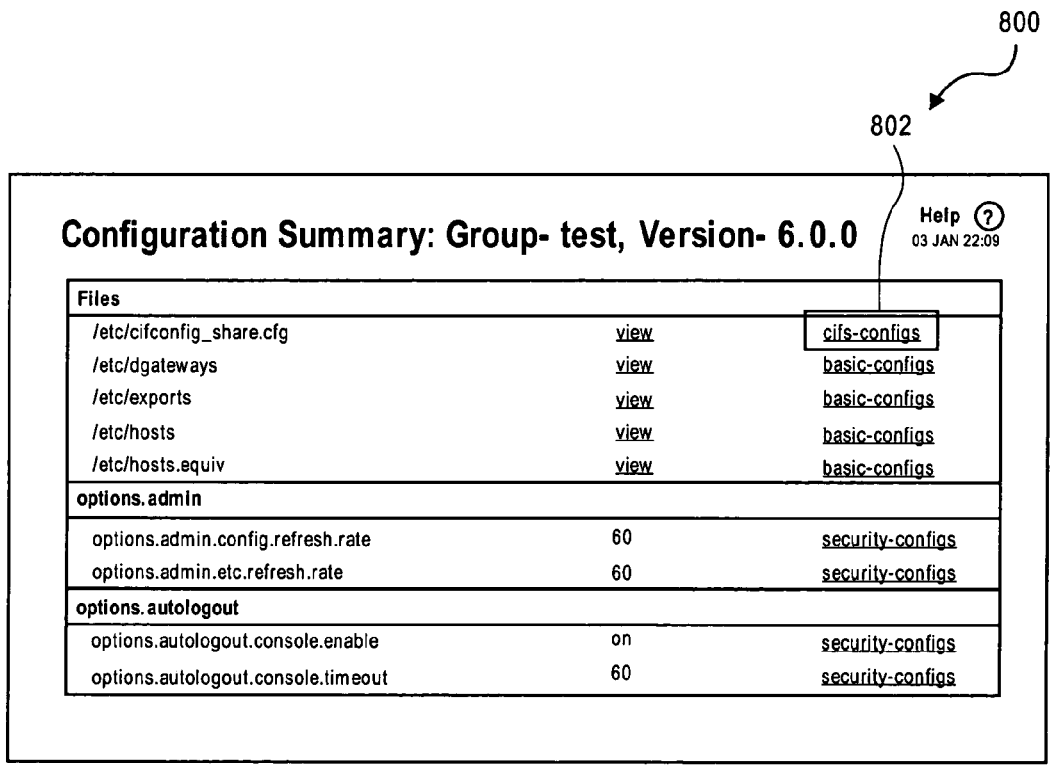
FIG. 8 is a configuration summary page, according to one embodiment of the present invention.

A user may view the details of the configuration for a particular filer via a configuration summary page 800, as illustrated in FIG. 8. When applying a configuration specification to a filer, the storage operating system allows a user to specify that some or all of the configuration settings on that filer should override the configuration parameters being pushed from the appliance management station 108. In FIG. 8, a user is presented with the merged configuration of all the files of the selected version of the storage operating system. Each entry in the summary page 800 has a link 802 to the configuration file from which the final value of this entry has been derived.

Returning to FIG. 1, the filers 102 may be running different versions of the storage operating system. When the source configuration is pushed from the appliance management station 108 to the filer 102, the appliance management program 110 has to be aware of the version of the storage operating system running on the particular target filer. For example, if a target filer is running a storage operating system version that does not support or recognize some of the settings in the source configuration, such settings will have to be ignored, which may be accomplished by a plug-in provided with the storage operating system running on the target filer. A plug-in is typically a software component that enhances a larger piece of software by adding features or functions.

An upgrade/revert plug-in, which, in one embodiment, is implemented inside the appliance management program 110 codeline, implements version upgrade and version revert logic. Specifically, the upgrade/revert plug-in identifies the current version of the storage operating system and builds a table of all the earlier versions that the current version is aware of. This knowledge may be used when determining whether all or just some of the pushed configuration parameters are compatible with the storage operating system of the target filer.

In one embodiment of the present invention, the appliance management program has scripting capabilities (e.g., a scripting plug-in) so that the configuration history related to each individual file server appliance may be maintained by the appliance management program 110 and be accessible to a user. When the appliance management program 110 determines that the configuration for a particular filer has changed, a notification event may be generated by the appliance management program 110 to alert the administrator. For example, if the appliance management program 110 determines that a file server appliance's configuration differs from a predetermined baseline configuration, the appliance management program 110 may send a notification to the administrator. A notification may also be sent if the appliance management program 110 determines that the current configuration on a filer is different from the configuration that has been applied at an earlier point in time to the filer. The appliance management program may also be configured to determine who made a configuration change and when that change has been made.

Figure 9:
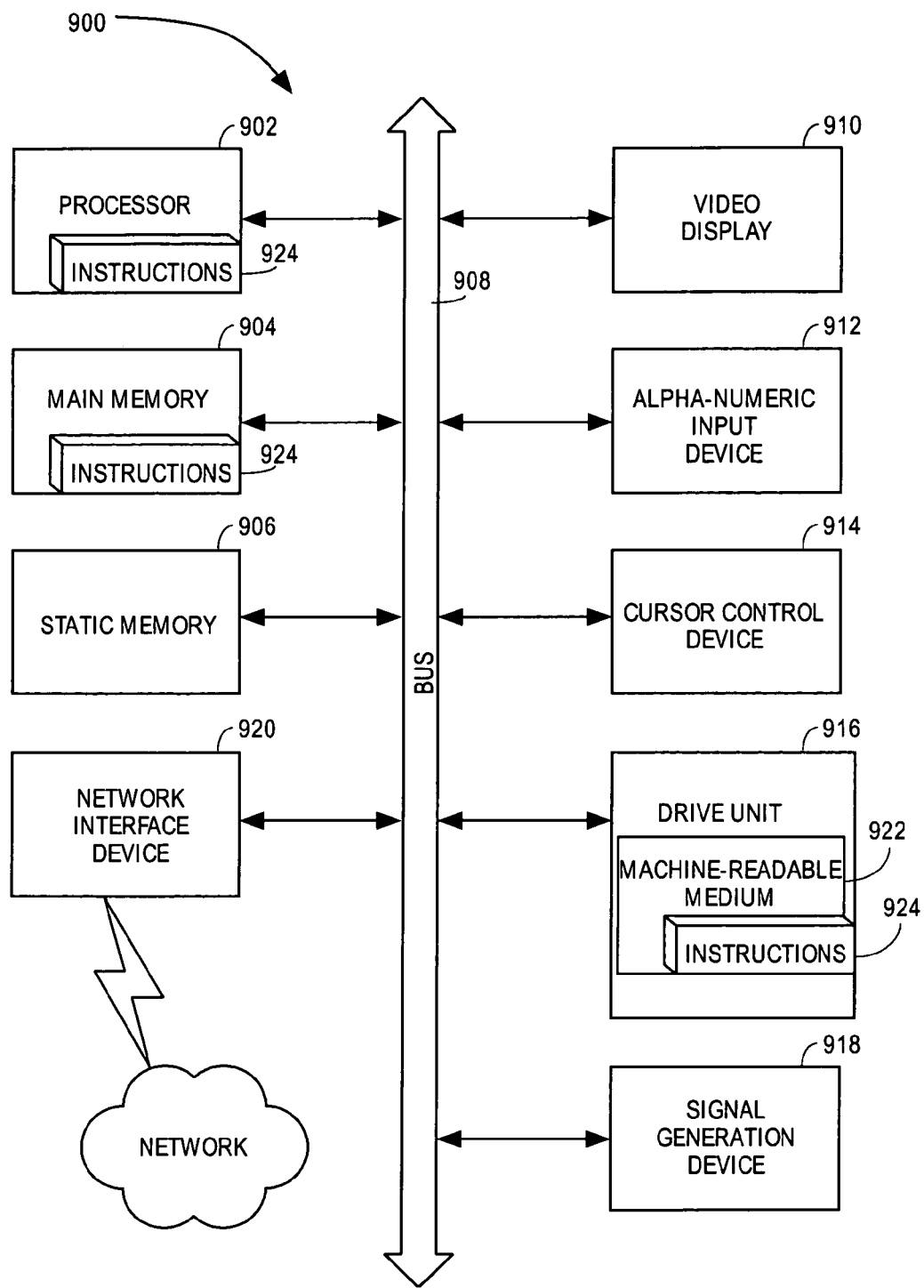
FIG. 9 is a diagrammatic representation of machine in the exemplary form of a computer system, according to one embodiment of the present invention.

FIG. 9 shows a diagrammatic representation of machine in the exemplary form of a computer system 900 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 900 includes a processor 902 (e.g., a central processing unit (CPU) a graphics processing unit (GPU) or both), a main memory 904 and a static memory 906, which communicate with each other via a bus 908. The computer system 900 may further include a video display unit 910 (e.g., a liquid crystal display (LCD) or a cathode ray tube (CRT)). The computer system 900 also includes an alphanumeric input device 912 (e.g., a keyboard), a cursor control device 914 (e.g., a mouse), a disk drive unit 916, a signal generation device 918 (e.g., a speaker) and a network interface device 920.

The disk drive unit 916 includes a machine-readable medium 922 on which is stored one or more sets of instructions (e.g., software 924) embodying any one or more of the methodologies or functions described herein. The software 924 may also reside, completely or at least partially, within the main memory 904 and/or within the processor 902 during execution thereof by the computer system 900, the main memory 904 and the processor 902 also constituting machine-readable media.

The software 924 may further be transmitted or received over a network 926 via the network interface device 920.

While the machine-readable medium 992 is shown in an exemplary embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. The term "machine-readable medium" shall accordingly be taken to include, but not be limited to, solid-state memories, optical and magnetic media, and carrier wave signals.

Thus, a method and system to manage configuration information for multiple file server appliances, according to one embodiment of the present invention, have been described. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

What is claimed is:

1. A method comprising:
    obtaining a source configuration specification from a storage server, the storage server being from a plurality of storage servers, the source configuration specification defining configuration settings of the storage server, wherein the configuration settings of the storage server include at least one of a startup parameter, a communication setting, or an access control setting and do not include parameters that designate allocation of storage resources;
    identifying a group including one or more target servers from the plurality of storage servers;
    generating a target configuration specification by trimming the source configuration specification, such that the target configuration specification includes at least one but not all of the configuration settings defined by the source configuration specification;
    receiving information identifying a version of a storage operating system executing on the target servers;
    identifying what configuration parameters of the target configuration specification are compatible with the version of the storage operating system executing on the target servers;
    pushing the target configuration specification to the group of target servers to apply the target configuration specification to the target servers; determining a configuration history of an individual storage server of the group of target servers over a period of time;
    detecting a change in a configuration setting of the individual storage server based on the configuration history;
    generating a notification event based on the detection; and
    providing a notification to a user at an appliance management program in response to generating the notification event.

2. The method of claim 1, wherein the obtaining of the source configuration specification is responsive to receiving a request from an administrator station.

3. The method of claim 1, wherein the source configuration specification comprises a plurality of name-value pairs.

4. The method of claim 3, further comprising identifying a subset of the name-value pairs in the source configuration specification to generate the target configuration.

5. The method of claim 1, further comprising generating a first notification responsive to determining that the configuration specification of the storage server from the plurality of storage servers has changed since the last time the storage server has been brought up.

6. The method of claim 1, further comprising generating a second notification responsive to determining that the configuration specification of the storage server from the plurality of storage servers has changed compared to the target configuration specification.

7. The method of claim 1, further comprising enabling a user to define the target group by selecting the one or more target storage servers.

8. The method of claim 1, wherein the pushing of the target configuration specification to the one or more target storage servers does not require a request for the target configuration specification from any of the one or more target storage servers.

9. A system comprising: a plurality of storage servers; and a configuration server, coupled to the plurality of storage servers, to:
- obtain a source configuration specification from a storage server, the storage server being from a plurality of storage servers, the source configuration specification defining configuration settings of the storage server, wherein the configuration settings include at least one of a startup parameter, a communication setting, or an access control setting and do not include parameters that designate allocation of storage resources;
- identify a group including one or more target servers from the plurality of storage servers;
- generate a target configuration specification by trimming the source configuration specification, such that the target configuration specification includes at least one but not all of the configuration settings defined by the source configuration specification;
- push the target configuration specification to the group of target servers to apply the target configuration specification to the target servers; receive information identifying a version of a storage operating system executing on the target servers;
- identifying what configuration parameters of the target configuration specification are compatible with the version of the storage operating system executing on the target servers;
- determining a configuration history of an individual storage server of the group of target servers over a period of time;
- detecting a change in a configuration settings of the individual storage server based on the configuration history;
- generate a notification event based on the detection; and
- provide a notification to a user at an appliance management program in response to generating the notification event.

10. The system of claim 9, wherein the target configuration specification comprises a partial collection of registry settings and configuration files for the storage server.

11. The system of claim 9, further comprising an administrator station to:
- generate the source configuration specification for the storage server; and
- send a request to the configuration server to obtain the source configuration specification from the storage server.

12. A configuration server comprising:
a processor;
a first component to obtain a source configuration specification from a storage server, the storage server being from a plurality of storage servers, the source configuration specification defining configuration settings of the storage server, wherein the configuration settings include at least one of a startup parameter, a communication setting, or an access control setting and do not include parameters that designate allocation of storage resources;
a second component to identify a group including one or more target servers from the plurality of storage servers;
a third component to generate a target configuration specification by trimming the source configuration specification, such that the target configuration specification includes at least one but not all of the configuration settings defined by the source configuration specification;
a fourth component to receive information identifying a version of a storage operating system executing on the target servers;
a fifth component to identify what configuration parameters of the target configuration specification are compatible with the version of the storage operating system executing on the target servers;
a sixth component to push the target configuration specification to the group of target servers to apply the target configuration specification to the target servers;
a seventh component to determine a configuration history of an individual storage server of the group of target servers over a period of time and detect a change in a configuration setting of the individual storage server based on the configuration history;
an eighth component to generate a notification event based on the detection; and
a ninth component to provide a notification to a user at an appliance management program in response to generating the notification event.

13. The configuration server of claim 12, wherein the target configuration specification comprises a partial collection of registry settings and configuration files for the storage server.

14. A method to manage configuration information, the method comprising:
- retrieving a configuration specification from a first server, the configuration specification defining configuration settings of the first server, wherein the configuration settings include at least one of a startup parameter, a communication settings, or an access control setting and do not include parameters that designate allocation of storage resources; identifying a target group including one or more target servers;
- generating a target configuration specification by trimming the source configuration specification, such that the target configuration specification includes at least one but not all of the configuration settings defined by the source configuration specification;
- receiving information identifying a version of a storage operating system executing on the target servers;
- identifying what configuration parameters of the target configuration specification are compatible with the version of the storage operating system executing on the target servers;
- pushing the partial configuration to the group of target servers to apply the partial configuration to the target servers;
- determining a configuration history of an individual storage server of the group of target servers over a period of time;
- detecting a change in a configuration setting of the individual storage server based on the configuration history; and
- generating a notification event based on the comparison; and
- providing a notification to a user at an appliance management program in response to generating the notification event.

15. The method of claim 14, wherein the retrieving of the configuration specification is responsive to receiving a request from an administrator station.

16. A computer-readable storage medium having stored thereon data representing sets of instructions which, when executed by a machine, cause the machine to:
- obtain a source configuration specification from a storage server, the storage server being from a plurality of storage servers, the source configuration specification defining configuration settings of the storage server, wherein the configuration settings include at least one of a startup parameter, a communication setting, or an access control setting and do not include parameters that designate allocation of storage resources;

identify a target group including one or more target servers from the plurality of storage servers;

generate a target configuration specification by trimming the source configuration specification, such that the target configuration specification includes at least one but not all of the configuration settings defined by the source configuration specification;

receive information identifying a version of a storage operating system executing on the target servers;

identify what configuration parameters of the target configuration specification are compatible with the version of the storage operating system executing on the target servers;

push the target configuration specification to the group of target servers to apply the target configuration specification to the target servers;

determining a configuration history of an individual storage server of the group of target servers over a period of time;

detecting a change in a configuration setting of the individual storage server based on the configuration history; and generate a notification event based on the comparison; and provide a notification to a user at an appliance management program in response to generating the notification event.

17. The method of claim 1, further comprising:

resolving, via a plug-in, incompatibilities between the target configuration specification and the version of the storage operating system by ignoring incompatible parameters.

18. The method of claim 1, further comprising: generating a configuration history script of a target server.

* * * * *